US012233409B2

(12) United States Patent
Geng et al.

(10) Patent No.: US 12,233,409 B2
(45) Date of Patent: Feb. 25, 2025

(54) MICRO-FLUIDIC CHIP, FABRICATION METHOD THEREOF AND MICRO-FLUIDIC DEVICE

(71) Applicants: BEIJING BOE SENSOR TECHNOLOGY CO., LTD., Beijing (CN); BOE TECHNOLOGY GROUP CO., LTD., Beijing (CN)

(72) Inventors: Yue Geng, Beijing (CN); Xue Dong, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1055 days.

(21) Appl. No.: 17/043,985

(22) PCT Filed: Apr. 24, 2020

(86) PCT No.: PCT/CN2020/086671
§ 371 (c)(1),
(2) Date: Sep. 30, 2020

(87) PCT Pub. No.: WO2020/233343
PCT Pub. Date: Nov. 26, 2020

(65) Prior Publication Data

US 2023/0149920 A1 May 18, 2023

(30) Foreign Application Priority Data

May 17, 2019 (CN) ......................... 201910412333.8

(51) Int. Cl.
*B01L 3/00* (2006.01)

(52) U.S. Cl.
CPC ..... *B01L 3/502707* (2013.01); *B01L 2200/12* (2013.01); *B01L 2300/0809* (2013.01); *B01L 2400/0415* (2013.01)

(58) Field of Classification Search
CPC ......... B01L 3/502792; B01L 3/502715; B01L 3/502707; B01L 2300/0887;
(Continued)

(56) References Cited

U.S. PATENT DOCUMENTS 7,815,871 B2 * 10/2010 Pamula ............. B01L 3/502792 422/81
8,809,068 B2 * 8/2014 Sista ......................... G01N 1/38 422/50
(Continued)

FOREIGN PATENT DOCUMENTS

CN 102666841 A 9/2012
CN 104422781 A 3/2015
(Continued)

OTHER PUBLICATIONS

Office Action dated Jan. 12, 2021 issued in corresponding Chinese Application No. 201910412333.8.

*Primary Examiner* — Shogo Sasaki
(74) *Attorney, Agent, or Firm* — Nath, Goldberg & Meyer; Joshua B. Goldberg

(57) ABSTRACT

The present disclosure provides a micro-fluidic chip, a method for fabricating the same, and a micro-fluidic device. The micro-fluidic chip includes: an upper substrate and a lower substrate assembled to form a cell with a gap between the upper substrate and the lower substrate, the gap being configured to accommodate a droplet; a driving electrode on an upper substrate side or a lower substrate side, the driving electrode being configured to control the droplet to move in a powered-on state, wherein the micro-fluidic chip further
(Continued)

includes a laser source on the upper substrate side or the lower substrate side and configured to provide illumination for detection of the droplet.

8 Claims, 5 Drawing Sheets

(58) Field of Classification Search
CPC ....... B01L 2300/161; B01L 2400/0415; B01L 2200/12; B01L 2400/0427; B01L 2300/0809; B01L 2300/0654
See application file for complete search history.

(56) References Cited

U.S. PATENT DOCUMENTS

| | | | | |
|---|---|---|---|---|
| 9,476,856 | B2 * | 10/2016 | Pamula | G01N 27/72 |
| 10,118,175 | B2 * | 11/2018 | Akella | F04B 19/006 |
| 10,585,090 | B2 * | 3/2020 | Pamula | B03C 1/30 |
| 2006/0260919 | A1 * | 11/2006 | Aimi | H01H 11/02 200/83 F |
| 2007/0031097 | A1 * | 2/2007 | Heikenfeld | G02B 26/02 362/600 |
| 2010/0041086 | A1 * | 2/2010 | Pamula | B01L 3/502784 435/18 |
| 2010/0270156 | A1 * | 10/2010 | Srinivasan | B01F 33/3031 204/450 |
| 2012/0044299 | A1 * | 2/2012 | Winger | B41J 2/1606 428/411.1 |
| 2014/0030717 | A1 | 1/2014 | Zhong et al. | |
| 2014/0124037 | A1 * | 5/2014 | Foley | B01L 3/50273 422/504 |
| 2016/0299101 | A1 * | 10/2016 | Pantoja | B01L 3/50273 |
| 2018/0111126 | A1 * | 4/2018 | Osmus | G01N 33/573 |
| 2018/0193840 | A1 * | 7/2018 | Von Hatten | B01L 3/502792 |
| 2019/0168223 | A1 * | 6/2019 | Soto-Moreno | C12M 23/40 |
| 2020/0179933 | A1 * | 6/2020 | Jebrail | B01L 3/502792 |
| 2021/0231606 | A1 * | 7/2021 | Gupta | B01L 3/502792 |
| 2022/0297129 | A1 * | 9/2022 | Soto-Moreno | B01L 3/502792 |

FOREIGN PATENT DOCUMENTS

| | | | |
|---|---|---|---|
| CN | 107607475 | A | 1/2018 |
| CN | 108816299 | A | 11/2018 |
| CN | 109136087 | A | 1/2019 |
| CN | 109216266 | A | 1/2019 |
| CN | 110064449 | A | 7/2019 |
| KR | 20180105439 | A | 9/2018 |

* cited by examiner

MICRO-FLUIDIC CHIP, FABRICATION METHOD THEREOF AND MICRO-FLUIDIC DEVICE

CROSS REFERENCE TO RELATED APPLICATION

This is a National Phase Application filed under 35 U.S.C. 371 as a national stage of PCT/CN2020/086671, filed on Apr. 24, 2020, an application claiming priority to Chinese patent application No. 201910412333.8, filed on May 17, 2019, the entire contents of which are incorporated herein by reference.

TECHNICAL FIELD

The present disclosure relates to the field of digital micro-fluidic technologies, and in particular, to a micro-fluidic chip, a fabrication method thereof and a micro-fluidic device.

BACKGROUND

The digital micro-fluidic technology can accurately control the movement of the droplet, realize the operations on the droplet such as fusion and separation, and achieve various biochemical reactions. Compared with the general micro-fluidic technology, the operation on the liquid can be accurate to each drop of droplet, the target reaction can be completed with less reagent amount, and the control of the reaction rate and the reaction progress is more accurate in the digital micro-fluidic technology. Therefore, the digital micro-fluidic technology has excellent development prospect in the field of biological detection.

In the scenario of biological detection, the digital micro-fluidic chip only has the function of droplet manipulation, and light sources and detection apparatuses are necessary for realizing the final detection. At present, in all biological detection scenarios where light sources are required, the light sources are installed on the detection apparatus or equipment, which obviously goes against the development trend of miniaturization and portability of the apparatus.

SUMMARY

In one aspect, the present disclosure provides a micro-fluidic chip including: an upper substrate and a lower substrate assembled to form a cell with a gap between the upper substrate and the lower substrate, the gap being configured to accommodate a droplet;

- a driving electrode on an upper substrate side or a lower substrate side, the driving electrode being configured to control the droplet to move in a powered-on state,
- wherein the micro-fluidic chip further includes a laser source on the upper substrate side or the lower substrate side and configured to provide illumination for detection of the droplet.

In an embodiment, the micro-fluidic chip further includes a detection element on the upper substrate side or the lower substrate side and configured to detect the droplet, and

- the detection element and the laser source are respectively on two opposite sides of the gap, and an orthographic projection of the detection element on the upper substrate at least partially overlaps with an orthographic projection of the laser source on the upper substrate.

In an embodiment, the laser source is on a side of the upper substrate close to the lower substrate, and the detection element is on a side of the lower substrate close to the upper substrate.

In an embodiment, the laser source is on a side of the lower substrate close to the upper substrate, and the detection element is on a side of the upper substrate close to the lower substrate.

In an embodiment, a light emitting direction of the laser source is parallel to a thickness direction of the micro-fluidic chip.

In an embodiment, a first planarization layer is further on a side of the upper substrate on which the laser source is disposed, a via hole is in the first planarization layer, a bottom electrode is on the upper substrate at a bottom of the via hole, and a top electrode is on two opposite sides of an edge of a top opening of the via hole;

- a part of the laser source is in the via hole, the laser source includes a first electrode and a second electrode, the first electrode is coupled to the bottom electrode, the second electrode is coupled to the top electrode, and the bottom electrode and the top electrode are respectively coupled to an output terminal of a power supply to provide power to the laser source; and
- a second planarization layer is on a side of the laser source away from the first planarization layer, and a first hydrophobic layer is on a side of the second planarization layer away from the laser source and is configured to contact with the droplet.

In an embodiment, a first planarization layer is further on a side of the lower substrate on which the laser source is disposed, a via hole is in the first planarization layer, a bottom electrode is on the lower substrate at a bottom of the via hole, and a top electrode is on two opposite sides of an edge of a top opening of the via hole;

- a part of the laser source is in the via hole, the laser source includes a first electrode and a second electrode, the first electrode is coupled to the bottom electrode, the second electrode is coupled to the top electrode, and the bottom electrode and the top electrode are respectively coupled to an output terminal of a power supply to provide power for the laser source; and
- a second planarization layer is on a side of the laser source away from the first planarization layer, and a first hydrophobic layer is on a side of the second planarization layer away from the laser source and is configured to contact with the droplet.

In an embodiment, a micro-lens structure is further on a light emitting surface of the laser source, and is configured to converge light emitted by the laser source.

In an embodiment, the laser source includes a vertical cavity surface-emitting laser.

In an embodiment, a third planarization layer is further on a side of the detection element away from the lower substrate; and

- a second hydrophobic layer is further on a side of the third planarization layer away from the detection element and configured to contact with the droplet.

In an embodiment, a third planarization layer is further on a side of the detection element away from the upper substrate; and

- a second hydrophobic layer is further on a side of the third planarization layer away from the detection element and configured to contact with the droplet.

In an embodiment, the driving electrode is on the third planarization layer and between the third planarization layer and the second hydrophobic layer, and a first insulating layer is further between the driving electrode and the second hydrophobic layer.

In an embodiment, the driving electrode is on the second planarization layer and between the second planarization layer and the first hydrophobic layer, and a second insulating layer is between the driving electrode and the first hydrophobic layer.

In another aspect, the present disclosure further provides a micro-fluidic device, including the micro-fluidic chip described above, and a signal processing unit coupled to the detection element of the micro-fluidic chip and configured to process a signal detected by the detection element to obtain a detection result for the droplet.

In an embodiment, there is provided a method for fabricating a micro-fluidic chip, the micro-fluidic chip is the micro-fluidic chip described above, and the method includes:

- forming the driving electrode on the upper substrate side or the lower substrate side; and
- forming the laser source on the upper substrate side or the lower substrate side.

In an embodiment, forming the laser source on the upper substrate side or the lower substrate side includes: preparing the laser source on a wafer;

- forming a first planarization layer on a side of the upper substrate or the lower substrate on which the laser source is to be formed;
- forming a via hole in the first planarization layer;
- forming a bottom electrode on the upper substrate or the lower substrate at a bottom of the via hole;
- forming a top electrode on two opposite sides of an edge of a top opening of the via hole; and
- transferring the laser source into the via hole by semiconductor stripping and transferring, and coupling a first electrode and a second electrode of the laser source to the bottom electrode and the top electrode respectively.

In an embodiment, the method further includes forming a micro-lens structure on a light emitting surface of the laser source.

DETAILED DESCRIPTION

In order to make those skilled in the art better understand the technical solutions of the present disclosure, a micro-fluidic chip, a method for fabricating the micro-fluidic chip, and a micro-fluidic device of the present disclosure are described in further detail below with reference to the accompanying drawings and the detailed description.

Figure 1:
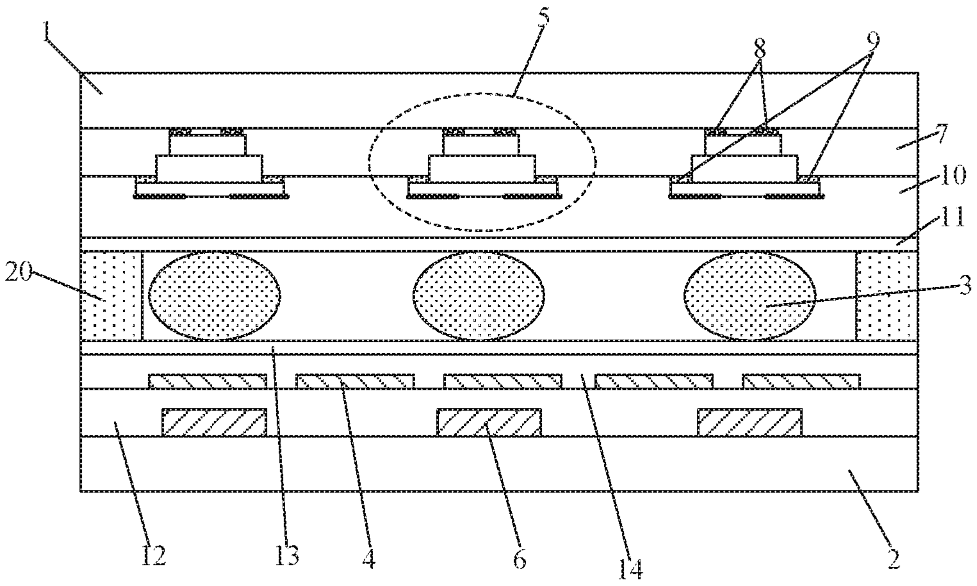
FIG. 1 is a structural cross-sectional view of a micro-fluidic chip according to an embodiment of the present disclosure.
Figure 2:
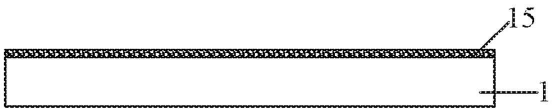
FIG. 2 is a structural cross-sectional view in Step (1) of fabricating a micro-fluidic chip in an embodiment.
Figure 3:
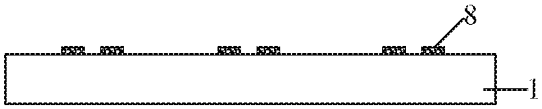
FIG. 3 is a structural cross-sectional view in Step (2) of fabricating a micro-fluidic chip in an embodiment.
Figure 4:
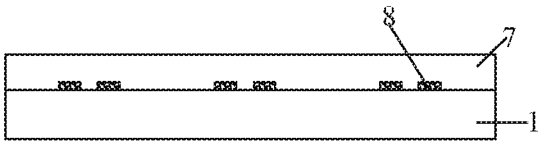
FIG. 4 is a structural cross-sectional view in Step (3) of fabricating a micro-fluidic chip in an embodiment.
Figure 5:
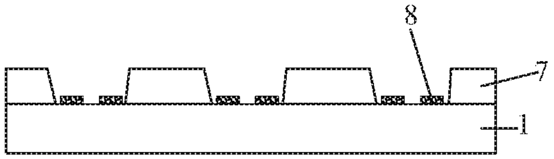
FIG. 5 is a structural cross-sectional view in Step (4) of fabricating a micro-fluidic chip in an embodiment.
Figure 6:
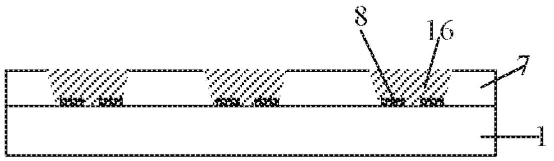
FIG. 6 is a structural cross-sectional view in Step (5) of fabricating a micro-fluidic chip in an embodiment.
Figure 7:
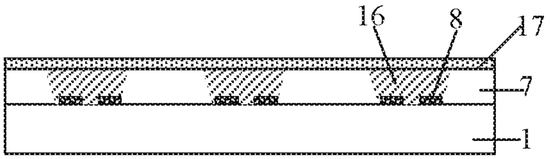
FIG. 7 is a structural cross-sectional view in Step (6) of fabricating a micro-fluidic chip in an embodiment.
Figure 8:
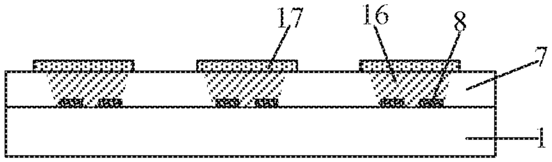
FIG. 8 is a structural cross-sectional view in Step (7) of fabricating a micro-fluidic chip in an embodiment.
Figure 9:
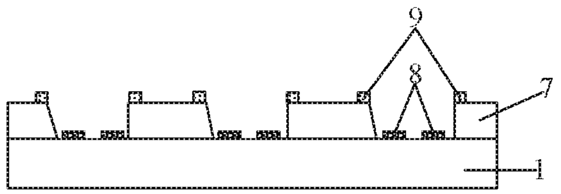
FIG. 9 is a structural cross-sectional view in Step (8) of fabricating a micro-fluidic chip in an embodiment.
Figure 10:
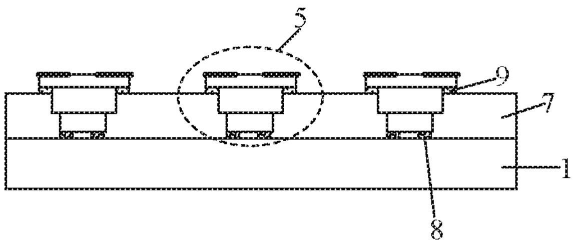
FIG. 10 is a structural cross-sectional view in Step (9) of fabricating a micro-fluidic chip in an embodiment.
Figure 11:
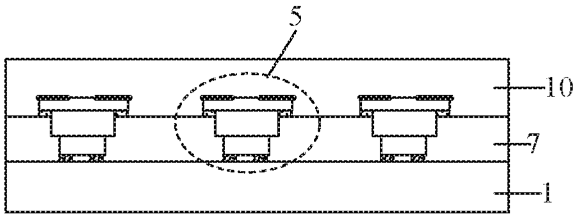
FIG. 11 is a structural cross-sectional view in Step (10) of fabricating a micro-fluidic chip in an embodiment.
Figure 12:
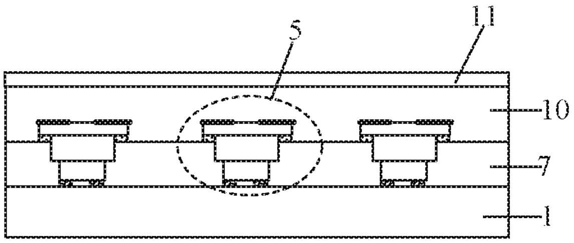
FIG. 12 is a structural cross-sectional view in Step (11) of fabricating a micro-fluidic chip in an embodiment.
Figure 13:
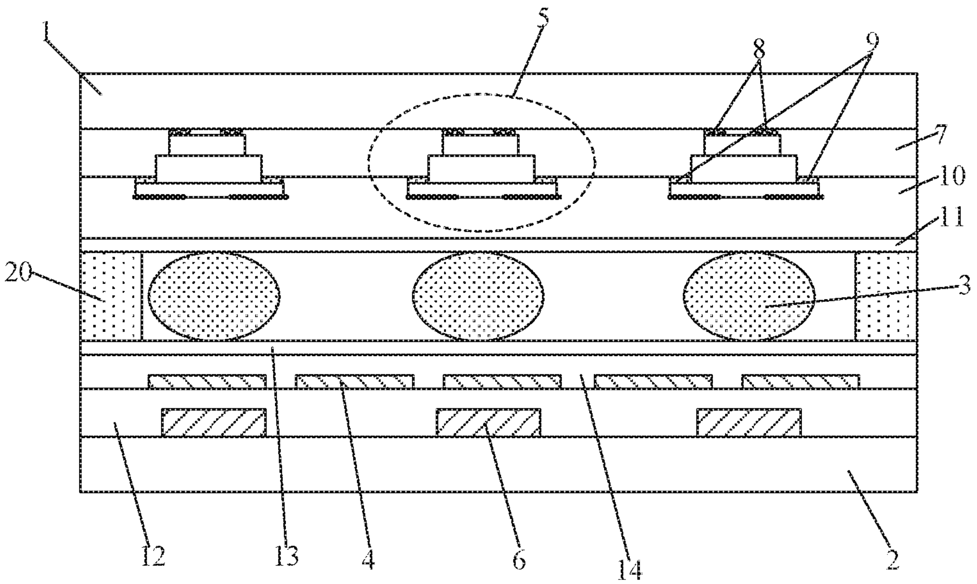
FIG. 13 a structural cross-sectional view in Step (12) of fabricating a micro-fluidic chip in an embodiment.

An embodiment of the present disclosure provides a micro-fluidic chip, as shown in FIG. 1, including an upper substrate 1 and a lower substrate 2 assembled to form a cell, a gap is formed between the upper substrate 1 and the lower substrate 2 and is configured to accommodate a biological droplet 3. Driving electrodes 4 are further disposed on a side of the lower substrate, and the driving electrodes 4 may control the biological droplet 3 to move in a powered-on state. The micro-fluidic chip further includes laser sources 5, and the laser sources 5 are disposed on a side of the upper substrate 1 and are configured to provide illumination for detection of the droplet 3.

In an embodiment, the micro-fluidic chip is a digital micro-fluidic chip. The digital micro-fluidic chip can accurately control the droplet 3 to move by the driving electrodes 4 disposed in the digital micro-fluidic chip, so as to realize the operations such as fusion, separation and the like of the droplet 3, and complete various biochemical reactions. Compared with a non-digital micro-fluidic chip, the digital micro-fluidic chip can accurately operate each droplet 3, complete target reaction with less reagent amount, and control the reaction rate and the reaction progress more accurately.

It should be noted that the driving electrodes 4 may be provided on a side of the upper substrate 1.

In an embodiment, the expression "a side of the upper substrate" may represent a position between the upper substrate 1 and the droplet 3 (or the gap), and hereinafter is also referred to as "an upper substrate side". The expression "a side of the lower substrate" may represent a position between the lower substrate 2 and the droplet 3 (or the gap), and hereinafter is also referred to as "a lower substrate side".

Compared with the existing detection chip which is only provided with the driving electrode 4 capable of controlling the droplet 3, the laser source 5 is disposed in the micro-fluidic chip, so that the detection chip integrates a light source for detection on the basis of controlling the droplet 3. Thus, the integration level of the micro-fluidic chip is improved, and meanwhile, the light source for detection is not required to be disposed on additional detection equipment, thereby facilitating the portability of the micro-fluidic chip and the miniaturization of detection equipment adopting the microfluidic chip.

In an embodiment of the present disclosure, the micro-fluidic chip further includes detection elements 6, and the detection elements 6 are disposed on the lower substrate side and are configured to detect the droplet 3. For example, the detection elements 6 are configured to detect light passing through the droplet. The detection element 6 and the laser source 5 are respectively disposed at two opposite sides of the gap, and the detection element 6 corresponds to the laser source 5 in position. In an embodiment, an orthographic projection of the detection element 6 on the upper substrate 1 (or the lower substrate 2) at least partially overlaps with an orthographic projection of the laser source 5 on the upper substrate 1 (or the lower substrate 2). For example, the orthographic projection of the detection element 6 on the upper substrate 1 (or the lower substrate 2) completely overlaps with the orthographic projection of the laser source 5 on the upper substrate 1 (or the lower substrate 2).

In an embodiment, the detection element 6 is an optical signal detection device, such as a charge coupled device (CCD), which is a detection element in which the magnitude of a signal is represented by the amount of charges and the signal is transmitted in a coupled manner. The CCD, also called an image sensor, is configured to convert an optical image into an electrical signal. The optical signal detection device is configured to receive the laser transmitted from the droplet 3 and convert the laser into an electrical signal, so as to achieve the detection of the droplet 3. The detection element 6 corresponds to the laser source 5 in position, so that the laser source 5 can provide sufficient light for the detection of the droplet 3, thereby facilitating the accurate detection of the droplet 3 by the detection element 6.

Compared with the existing detection chip only provided with the driving electrode 4 capable of controlling the droplet 3, the micro-fluidic chip integrates the detection element 6 for detection on the basis of controlling the droplet 3, so that the integration level of the micro-fluidic chip is improved, and meanwhile, the detection element 6 does not need to be disposed on additional detection equipment, thereby facilitating the portability of the micro-fluidic chip and the miniaturization of the detection equipment adopting the micro-fluidic chip.

In an embodiment of the present disclosure, the laser source 5 is disposed on a side of the upper substrate 1 close to the lower substrate 2, and the detection element 6 is disposed on a side of the lower substrate 2 close to the upper substrate 1.

In an embodiment of the present disclosure, the light emitting direction of the laser source 5 is parallel to the thickness direction of the micro-fluidic chip. In an embodiment of the present disclosure, the laser source 5 is a vertical cavity surface-emitting laser (VCSEL). By using the VCSEL, light is emitted out perpendicularly to the surface of the device, the area of the gap area irradiated by the laser source 5 can be increased, and meanwhile, the integration level of the micro-fluidic chip integrated with the laser source 5 is also reduced (that is, an optical waveguide and a device for collimating light beams are omitted). In addition, the vertical cavity surface-emitting laser also has the advantages of small far field divergence angle of light beams, easiness in realizing low threshold current operation and the like, and the advantages are favorable for integration of the vertical cavity surface-emitting laser on the micro-fluidic chip.

According to the difference in light-emitting direction, the vertical cavity surface-emitting lasers can be classified into top emitting type and bottom emitting type corresponding to different usage scenarios, but their working principles are the same, which may be summarized as following: reflectors at both ends of the resonator and the gain active region in the middle are all formed by epitaxial growth of semiconductor materials, and the emitting direction of the laser is perpendicular to the epitaxial layer plane. For example, the vertical cavity surface-emitting laser includes a Bragg reflector having a high reflectivity (>99%) (distributed Bragg reflector, DBR), a quantum well active region and metal electrodes. The quantum well active region is located between the n-type doped DBR and p-type doped DBR, the DBR reflector is formed by alternately growing high refractive index material layers and low refractive index material layers. The optical thickness of each material layer is ¼ of the laser wavelength, and the optical thickness of the quantum well active region is an integral multiple of ½ of the laser wavelength, so as to meet the resonance condition. The metal electrodes include a first electrode and a second electrode respectively coupled to the n-type doped DBR and the p-type doped DBR. The vertical cavity surface-emitting laser is an existing relatively mature laser emitting device, and its structure and working principle are not described herein.

In an embodiment of the present disclosure, a first planarization layer 7 is further disposed on a side of the upper substrate 1 where the laser source 5 is disposed. Via holes are formed in the first planarization layer 7 to accommodate the laser sources 5. Bottom electrodes 8 are disposed on the upper substrate 1 at the bottom of the via hole, and top electrodes 9 are disposed on two opposite sides of an edge of the top opening of the via hole. A part of the laser source 5 is located in the via hole, the laser source 5 includes a first electrode and a second electrode, the first electrode is coupled to the bottom electrode 8, the second electrode is coupled to the top electrode 9, and the bottom electrode 8 and the top electrode 9 are respectively coupled to an output terminal of the power supply to provide power to the laser source. A second planarization layer 10 is further disposed on a side of the laser source 5 away from the first planarization layer 7, a first hydrophobic layer 11 is further disposed on a side of the second planarization layer 10 away from the laser source 5, and the first hydrophobic layer 11 is configured to contact with the droplet 3.

In an embodiment of the present disclosure, the detection element 6 is disposed on the side of the lower substrate 2 close to the upper substrate 1, and a third planarization layer 12 is further disposed on a side of the detection element 6 away from the lower substrate 2 and a side of the lower substrate 2 close to the upper substrate 1, a second hydrophobic layer 13 is further disposed on a side of the third planarization layer 12 away from the detection element 6, and the second hydrophobic layer 13 is configured to contact with the droplet 3.

In an embodiment of the present disclosure, the driving electrodes 4 are disposed on the third planarization layer 12 and located between the third planarization layer 12 and the second hydrophobic layer 13, and a first insulating layer 14 is further disposed between the driving electrodes 4 and the second hydrophobic layer 13.

In an embodiment, the droplet 3 is controlled to move between the upper substrate 1 and the lower substrate 2 by the driving electrode 4 on the lower substrate 2. In an embodiment of the present disclosure, the laser source 5 emits laser toward the droplet 3, the laser passes through the droplet 3 and is detected by the detection element 6. In an embodiment, for example, the concentration of the droplet 3 may be determined by the intensity of the laser detected by the detection element 6, thereby achieving detection of the droplet 3. In an embodiment, the structural layers on the upper substrate 1 and the lower substrate 2 are transparent film layers. The first planarization layer 7, the second planarization layer 10, the third planarization layer 12, and the first insulating layer 14 are insulating layers, and the insulating layers are made of an optically transparent resin such as SiO, SiN, PI, or PMMA. The second planarization layer 10 may fill the gap between the laser sources 5, such that the light emitting side of the laser sources 5 tends to be flat, and the third planarization layer 12 may fill the gap between the detection elements 6, such that the side of the detection elements 6 facing the laser source 5 tends to be flat. The first hydrophobic layer 11 and the second hydrophobic layer 13 are made of a material such as teflon, CYTOP or fluorinated silane, which enables the initial contact angle of the droplet 3 in contact therewith to show hydrophobicity. The driving electrode 4 is formed of a transparent conductive layer such as ITO or IZO.

In an embodiment of the present disclosure, the upper substrate 1 and the lower substrate 2 assembled to form a cell may have a retaining wall structure formed by a sealing adhesive 20 coated on the periphery, so that a space for the droplet 3 to flow may be formed in the gap between the upper substrate 1 and the lower substrate 2.

Based on the above structure of the micro-fluidic chip, an embodiment of the disclosure also provides a fabrication method of the micro-fluidic chip, which includes forming a laser source on an upper substrate side and forming a driving electrode on a lower substrate side.

In an embodiment, forming the laser source on the upper substrate side includes: preparing the laser source on a wafer;

- forming a first planarization layer on the upper substrate;
- forming a via hole in the first planarization layer;
- forming bottom electrodes on the upper substrate at the bottom of the via hole;
- forming top electrodes on two opposite sides of an edge of a top open of the via hole; and
- transferring the laser source into the via hole by semiconductor stripping and transferring, and coupling a first electrode and a second electrode of the laser source to the bottom electrode and the top electrode respectively.

For example, as shown in FIGS. 2-13, the method includes: step (1), depositing a bottom electrode film layer 15 on the upper substrate 1; step (2), forming a pattern of the bottom electrodes 8 by etching; step (3), depositing the first planarization layer 7; step (4), etching the first planarization layer 7 to form a via hole; step (5), filling the via hole by a sacrificial layer 16; step (6), depositing a top electrode film layer 17; step (7), etching the top electrode film layer 17; step (8), etching the top electrode film layer 17 and the sacrificial layer to form a pattern of the final top electrodes 9; step (9), transferring the laser source into the via hole by using semiconductor stripping and transferring technology and coupling the laser source to the bottom electrodes 8 and the top electrodes 9; step (10), depositing a second planarization layer 10; step (11), depositing a first hydrophobic layer 11; and step (12), assembling the upper substrate 1 and the lower substrate 2 subjected to the above steps to form a final micro-fluidic chip structure.

In an embodiment, the detection element, the third planarization layer, the driving electrode, the first insulating layer, and the second hydrophobic layer are sequentially formed on the lower substrate by using conventional patterning processes (including the steps of film formation, exposure, development, etching, and the like), which are not described herein.

Figure 14:
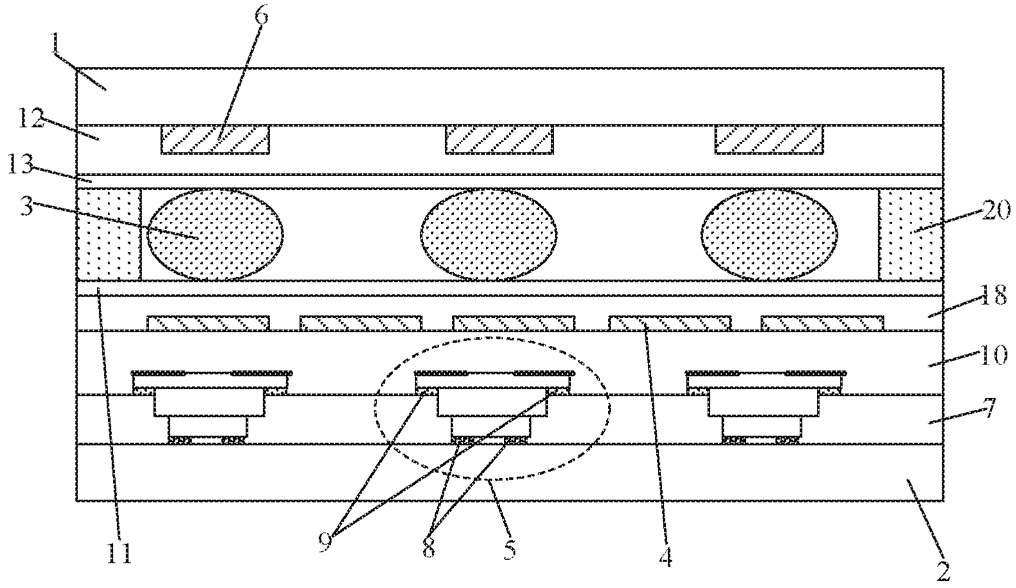
FIG. 14 is a structural cross-sectional view of a micro-fluidic chip according to an embodiment of the present disclosure.

An embodiment of the present disclosure provides a micro-fluidic chip, which is different from the above embodiments in that, as shown in FIG. 14, the laser source 5 is disposed on the side of the lower substrate 2 close to the upper substrate 1, and the detection element 6 is disposed on the side of the upper substrate 1 close to the lower substrate 2.

That is, the laser source 5 and the driving electrode 4 are both located on the lower substrate side.

In an embodiment of the present disclosure, the first planarization layer 7 is disposed on the side of the lower substrate 2, where the laser source 5 is located, close to the upper substrate, the via hole is formed in the first planarization layer 7, bottom electrodes 8 are disposed on the lower substrate 2 at the bottom of the via hole, and top electrodes 9 are disposed on two opposite sides of an edge of a top opening of the via hole. A part of the laser source 5 is located in the via hole, the laser source 5 includes a first electrode and a second electrode, the first electrode is coupled to the bottom electrodes 8, the second electrode is coupled to the top electrodes 9, and the bottom electrodes 8 and the top electrodes 9 are respectively coupled to the output terminal of the power supply to provide power to the laser source. The second planarization layer 10 is further disposed on the side of the laser source 5 away from the first planarization layer 7, the first hydrophobic layer 11 is further disposed on the side of the second planarization layer 10 away from the laser source 5, and the first hydrophobic layer 11 is configured to contact with the droplet 3.

In an embodiment of the present disclosure, the detection element 6 is disposed on the side of the upper substrate 1 close to the lower substrate 2, and the third planarization layer 12 is further disposed on the side of the detection element 6 away from the upper substrate 1. The second hydrophobic layer 13 is also disposed on the side of the third planarization layer 12 away from the detection element 6, and the second hydrophobic layer 13 is configured to contact with the droplet 3.

In an embodiment of the present disclosure, the driving electrode 4 is disposed on the second planarization layer 10, and is located between the second planarization layer 10 and the first hydrophobic layer 11, and a second insulating layer 18 is further disposed between the driving electrode 4 and the first hydrophobic layer 11.

In an embodiment, the second insulating layer 18 is made of an optically transparent resin such as SiO, SiN, PI, or PMMA.

In an embodiment of the present disclosure, other structures of the micro-fluidic chip and materials and functions of the film layers of the structures are the same as those in the above embodiments, and are not described herein.

Based on the above structure of the micro-fluidic chip, an embodiment of the present disclosure also provides a method for fabricating the micro-fluidic chip, which is different from the above embodiments in that the laser source is formed on the lower substrate side and the detection element is formed on the upper substrate side.

In an embodiment, the specific process steps for forming the laser source on the lower substrate side are the same as those in the above embodiment, and are not described herein.

Figure 15:
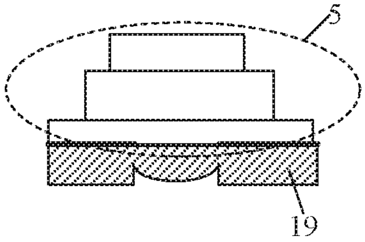
FIG. 15 is a structural cross-sectional view of a laser source in the micro-fluidic chip according to an embodiment.

An embodiment of the present disclosure provides a micro-fluidic chip, which is different from the above embodiments in that, as shown in FIG. 15, on the basis of the above embodiment, a micro-lens structure 19 is further disposed on a light emitting surface of the laser source 5, and the micro-lens structure 19 is configured to converge light emitted by the laser source 5.

In an embodiment of the present disclosure, the method for fabricating a micro-fluidic chip further includes forming a micro-lens structure 19 on the light emitting surface of the laser source 5, on the basis of the method for fabricating a micro-fluidic chip according to above embodiments.

In an embodiment of the present disclosure, after the laser sources 5 are transferred from the semiconductor wafer to the upper substrate or the lower substrate, an additional process is used to form the micro-lens structure 19 at the light outlet of each laser source 5, and the addition of the micro-lens structure 19 is beneficial to the convergence of the light beams emitted by the laser source 5, thereby improving the quality of light emission and light signal detection. The micro-lens structure 19 may be made of SiO, SiN, or optically transparent resin, and the fabricating process thereof may include photoresist hot melt method, RIE/ICP dry etching, laser direct writing or the like. The specific fabricating process is a mature traditional process, and is not described herein.

Other structures and fabrication method of the micro-fluidic chip in the embodiment of the present disclosure are the same as those in the above embodiment, and are not described herein.

The beneficial effects are as follows: in the micro-fluidic chip provided by the embodiment of the disclosure, the laser source is disposed in the micro-fluidic chip. Compared with the existing detection chip which is only provided with the driving electrode capable of controlling the droplet, the micro-fluidic chip according to the embodiment of the disclosure integrates with the light source for detection on the basis of controlling the droplet, so that the integration level of the micro-fluidic chip is improved, and meanwhile, the light source for detection is not required to be disposed on additional detection equipment, thereby facilitating the portability of the micro-fluidic chip and the miniaturization of the detection equipment adopting the micro-fluidic chip.

An embodiment of the present disclosure provides a micro-fluidic device, which includes the micro-fluidic chip according to any one of the above embodiments, and further includes a signal processing unit coupled to the detection element of the micro-fluidic chip and configured to process a signal obtained by the detection element through detection, so as to obtain a detection result for a droplet.

By adopting the micro-fluidic chip according to any of the above embodiments, the integration level of the micro-fluidic device is improved, thereby facilitating the portability and the miniaturization of the micro-fluidic device.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A micro-fluidic chip comprising:

an upper substrate and a lower substrate assembled to form a cell with a gap between the upper substrate and the lower substrate, the gap being configured to accommodate a droplet;

a driving electrode on an upper substrate side or a lower substrate side, wherein the micro-fluidic chip further comprises a laser source on the upper substrate side and configured to provide illumination for detection of the droplet, a first planarization layer is further on a side of the upper substrate on which the laser source is disposed, a via hole is in the first planarization layer, a bottom electrode is on the upper substrate at a bottom of the via hole, and a top electrode is on two opposite sides of an edge of a top opening of the via hole;

a part of the laser source is in the via hole, the laser source comprises a first electrode and a second electrode, the first electrode is coupled to the bottom electrode, the second electrode is coupled to the top electrode, and the bottom electrode and the top electrode are respectively coupled to an output terminal of a power supply to provide power to the laser source;

a second planarization layer is further on a side of the laser source away from the first planarization layer, and a first hydrophobic layer is on a side of the second planarization layer away from the laser source and is configured to contact with the droplet; and the laser source comprises a vertical cavity surface-emitting laser.

2. The micro-fluidic chip of claim 1, further comprising a detection element on the upper substrate side or the lower substrate side and configured to detect the droplet, wherein the detection element and the laser source are respectively on two opposite sides of the gap, and an orthographic projection of the detection element on the upper substrate at least partially overlaps with an orthographic projection of the laser source on the upper substrate.

3. The micro-fluidic chip of claim 2, wherein the laser source is on a side of the upper substrate close to the lower substrate, and the detection element is on a side of the lower substrate close to the upper substrate.

4. The micro-fluidic chip of claim 3, wherein a light emitting direction of the laser source is parallel to a thickness direction of the micro-fluidic chip.

5. The micro-fluidic chip of claim 1, wherein a micro-lens structure is further on a light emitting surface of the laser source, and is configured to converge light emitted by the laser source.

6. The micro-fluidic chip of claim 1, wherein a third planarization layer is further on a side of the detection element away from the lower substrate; and a second hydrophobic layer is further on a side of the third planarization layer away from the detection element and configured to contact with the droplet.

7. The micro-fluidic chip of claim 6, wherein the driving electrode is on the third planarization layer and between the third planarization layer and the second hydrophobic layer, and a first insulating layer is further between the driving electrode and the second hydrophobic layer.

8. A micro-fluidic device, comprising the micro-fluidic chip of claim 1, and a signal processing unit coupled to the detection element of the micro-fluidic chip and configured to process a signal detected by the detection element to obtain a detection result for the droplet.

* * * * *